(12) United States Patent
Averdunk et al.

(10) Patent No.: US 9,589,146 B2
(45) Date of Patent: Mar. 7, 2017

(54) METHOD AND SYSTEM FOR HIDING SENSITIVE DATA IN LOG FILES

(71) Applicant: International Business Machines Corporation, Armonk, NY (US)

(72) Inventors: Ingo J. Averdunk, Markt Schwaben (DE); Gianluca Della Corte, Rome (IT); Stefano Proietti, Rome (IT); Antonio M. Sgro, Fiumicino (IT)

(73) Assignee: International Business Machines Corporation, Armonk, NY (US)

(*) Notice: Subject to any disclaimer, the term of this patent is extended or adjusted under 35 U.S.C. 154(b) by 41 days.

(21) Appl. No.: 14/258,294

(22) Filed: Apr. 22, 2014

(65) Prior Publication Data

US 2015/0302206 A1   Oct. 22, 2015

(51) Int. Cl.
*G06F 7/04* (2006.01)
*G06F 11/30* (2006.01)
*G06F 21/62* (2013.01)

(52) U.S. Cl.
CPC .................. *G06F 21/6209* (2013.01)

(58) Field of Classification Search
None
See application file for complete search history.

(56) References Cited

U.S. PATENT DOCUMENTS

| 7,475,260 B2* | 1/2009 | Curtis ........................... 713/193 |
| 7,703,144 B2* | 4/2010 | Polozoff ......................... 726/26 |
| 7,870,614 B1* | 1/2011 | Duhaime ............. G06Q 20/383 707/607 |
| 8,051,410 B2* | 11/2011 | Marfatia .................. G06F 8/51 717/124 |
| 8,166,313 B2 | 4/2012 | Fedtke |

(Continued)

FOREIGN PATENT DOCUMENTS

| WO | 2006025970 A2 | 3/2006 |
| WO | 2009015616 A2 | 2/2009 |

OTHER PUBLICATIONS

"How to Hide Confidential Data in Text Files", maketecheasier, Jan. 31, 2010, © 2007-2014 Make Tech Easier, All rights reserved, <http://www.maketecheasier.com/hide-confidential-data-in-text-files/>.

(Continued)

*Primary Examiner* — Dede Zecher
*Assistant Examiner* — Abdullah Almamun
(74) *Attorney, Agent, or Firm* — Edward P. Li

(57) ABSTRACT

An approach for hiding sensitive data in log files is provided. The approach uses a background program embedded within an operating system. The background program intercepts a write operation of an application and, in response to determining that the write operation is for a log file, gets content of the write operation. The background program checks a knowledge base that comprises information for the sensitive data and identifies the sensitive data in the content of the write operation. The background program masks the sensitive data in the content of the write operation, in response to determining that the content of the write operation has the sensitive data to be masked. In the log file, the background program writes modified content in which the sensitive data is masked.

12 Claims, 3 Drawing Sheets

(56) References Cited

U.S. PATENT DOCUMENTS

| | | | |
|---|---|---|---|
| 8,260,803 B2* | 9/2012 | Hsu | G06F 17/30516 707/769 |
| 8,316,240 B2* | 11/2012 | Graziani | 713/189 |
| 8,433,863 B1* | 4/2013 | Orcutt | 711/162 |
| 8,836,479 B2* | 9/2014 | Miasnik | 340/539.13 |
| 2002/0178382 A1* | 11/2002 | Mukai | H04L 63/20 726/4 |
| 2003/0212899 A1* | 11/2003 | Curtis | 713/200 |
| 2005/0114207 A1* | 5/2005 | Jania | G06F 17/30867 705/14.4 |
| 2007/0288768 A1* | 12/2007 | Nesta et al. | 713/194 |
| 2008/0256354 A1* | 10/2008 | Blumenau | G06F 17/30997 713/153 |
| 2009/0132419 A1* | 5/2009 | Grammer | G06F 21/6245 705/50 |
| 2009/0300002 A1* | 12/2009 | Thomas et al. | 707/5 |
| 2011/0131188 A1* | 6/2011 | Graziani et al. | 707/687 |
| 2011/0191394 A1* | 8/2011 | Winteregg | G06F 17/30 707/822 |
| 2012/0239540 A1 | 9/2012 | Rogers, Jr. et al. | |
| 2013/0152158 A1 | 6/2013 | Yoshihama | |

OTHER PUBLICATIONS

"Information Redaction and Masking in Log and Trace Files", An IP.com Prior Art Database Technical Disclosure, Authors et. al.: Disclosed Anonymously, IP.com No. IPCOM000233197D, IP.com Electronic Publication: Dec. 2, 2013, pp. 1-4.

"Support for confidential logging and tracing", IBM, WebSphere Adapters, Version 6.2.0, Operating Systems: AIX, HP_UX, Linux, Solaris, Windows, z/OS, IBM i, WebSphere Adapter for FTP, (C) Copyright IBM Corporation 2005, 2009, All Rights Reserved, <http://publib.boulder.ibm.com/infocenter/dmndhelp/v6r2mx/index.jsp?topic=/com.ibm.wsadapters.620.jca.ftp.doc/doc/cbp_ftp_confidential_trace.html>.

"System and method to allow the ability to prevent programming trace data in containing sensitive information", An IP.com Prior Art Database Technical Disclosure, Authors et. al.: Disclosed Anonymously, IP.com No. IPCOM000204074D, IP.com Electronic Publication: Feb. 10, 2011, pp. 1-2.

* cited by examiner

US 9,589,146 B2

METHOD AND SYSTEM FOR HIDING SENSITIVE DATA IN LOG FILES

TECHNICAL FIELD OF THE INVENTION

The present invention relates generally to data privacy, and more particularly to hiding sensitive data in log files for write operations of applications.

BACKGROUND

Privacy concerns exist wherever identifiable personal information is collected and stored in digital forms. Data privacy issues can arise in information from a wide range of sources. The challenge in data privacy is to share data while protecting identifiable personal information. When an external organization for software support is involved in solving problems of software, one of the most common issues with data privacy is to clean up all confidential or sensitive information from software log files before sending to the external organization for solving the problems of software. Currently, the way of handling this issue is, manually or through scripting, go inside the log files to find all possible sensitive data (for example, user names, passwords, IP addresses, and etc.), and mask the sensitive data with other strings.

SUMMARY

In one aspect, a computer-implemented method for hiding sensitive data in log files is provided. The method is implemented by a background program embedded within an operating system. The method comprises intercepting a write operation of an application; getting content of the write operation, in response to determining that the write operation is for a log file; checking a knowledge base which comprises information for the sensitive data; identifying the sensitive data in the content of the write operation; masking the sensitive data in the content of the write operation, in response to determining that the content of the write operation has the sensitive data to be masked; and writing, in the log file, modified content in which the sensitive data is masked.

In another aspect, a computer program product for hiding sensitive data in log files is provided. The computer program product comprises a computer readable storage medium having program code embodied therewith. The computer code is executable to intercept a write operation of an application. The computer code is executable to get content of the write operation, in response to determining that the write operation is for a log file. The computer code is executable to check a knowledge base comprising information for the sensitive data. The computer code is executable to identify the sensitive data in the content of the write operation. The computer code is executable to mask the sensitive data in the content of the write operation, in response to determining that the content of the write operation has the sensitive data to be masked. The computer code is executable to write, in the log file, modified content in which the sensitive data is masked.

In yet another aspect, a computer system for hiding sensitive data in log files is provided. The computer system comprises one or more processors, one or more computer-readable tangible storage devices, and program instructions stored on at least one of the one or more computer-readable tangible storage devices for execution by at least one of the one or more processors. The program instructions are executable to: intercept a write operation of an application; get content of the write operation, in response to determining that the write operation is for a log file; check a knowledge base comprising information for the sensitive data; identify the sensitive data in the content of the write operation; mask the sensitive data in the content of the write operation, in response to determining that the content of the write operation has the sensitive data to be masked; and write, in the log file, modified content in which the sensitive data is masked.

DETAILED DESCRIPTION

Embodiments of the present invention disclose a solution to resolve an issue of data privacy. The solution creates a software module that will intercept all log writing requests, verifies whether a current log file line contains sensitive information by checking a knowledge base which is customizable and stores information on all sensitive data related to a specific customer/application. The main advantages over the current existing solutions are as follows. (1) Since the software module is fully integrated with operating system, it does not require a change to each application. (2) The sensitive information is masked at runtime before writing them on the disk and thus the solution eliminates security exposures. (3) Performance is improved since the solution does not require any post-processing to go through all log files and find the sensitive data.

Figure 1:
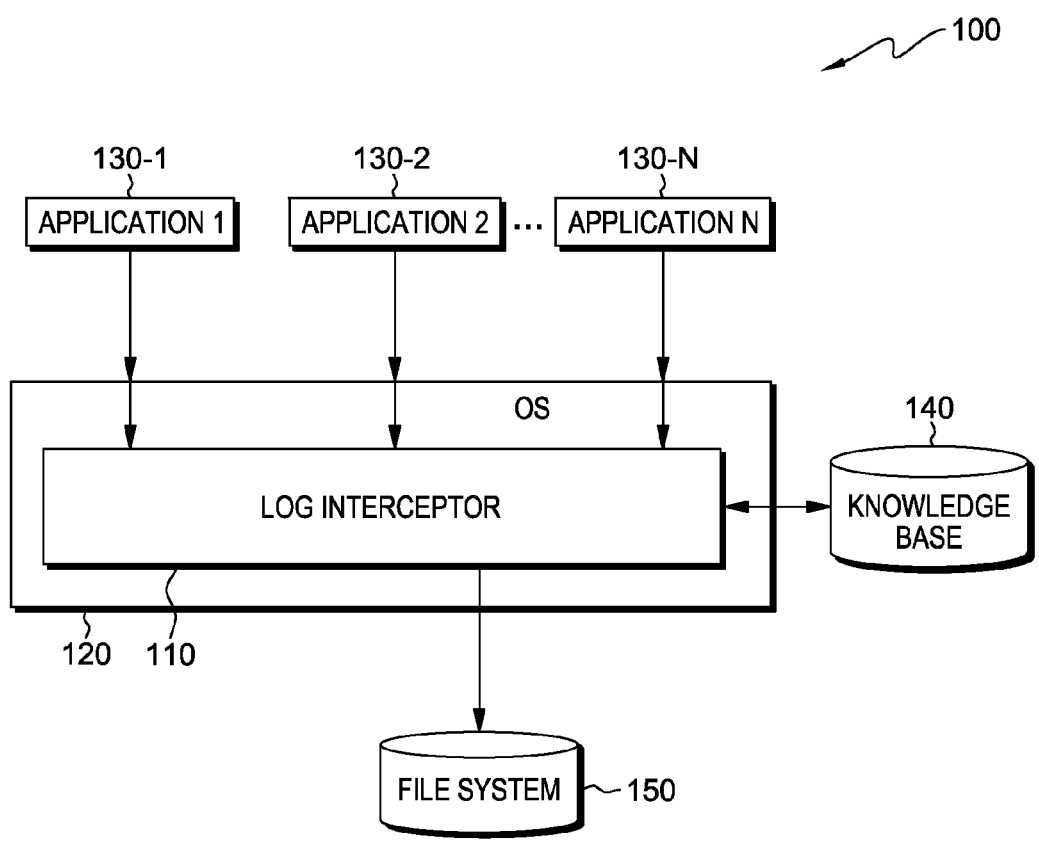
FIG. 1 is a diagram illustrating a computer system for hiding sensitive data in log files, in accordance with one embodiment of the present invention.

FIG. 1 is a diagram illustrating computer system 100 for hiding sensitive data in log files, in accordance with one embodiment of the present invention. Computer system 100 comprises log interceptor 110 embedded within operating system (OS) 120. Log interceptor 110 runs in the background as a daemon of OS 120. Log interceptor 110 intercepts all calls made from applications 1 through N (130-1 through 130-N) for write operations. The write operations write log files on file system 150. Log interceptor 110 uses knowledge base 140 to identify sensitive data to be removed in the write operations. To help log interceptor 110 identify the sensitive data, knowledge base 140 stores, for example, the following data: names of all log files that applications 1 through N (130-1 through 130-N) may write, customer sensitive information (e.g., IP addresses, hostnames, user names, etc.), and additional custom recognizable patterns validated by users. Log interceptor 110 includes an embedded analytics engine; the analytics engine provides a confidence index that determines whether patterns or information in the message content are sensitive or not. The analytic engine is an optional component that increases accuracy in determining the sensitive data.

Figure 2:
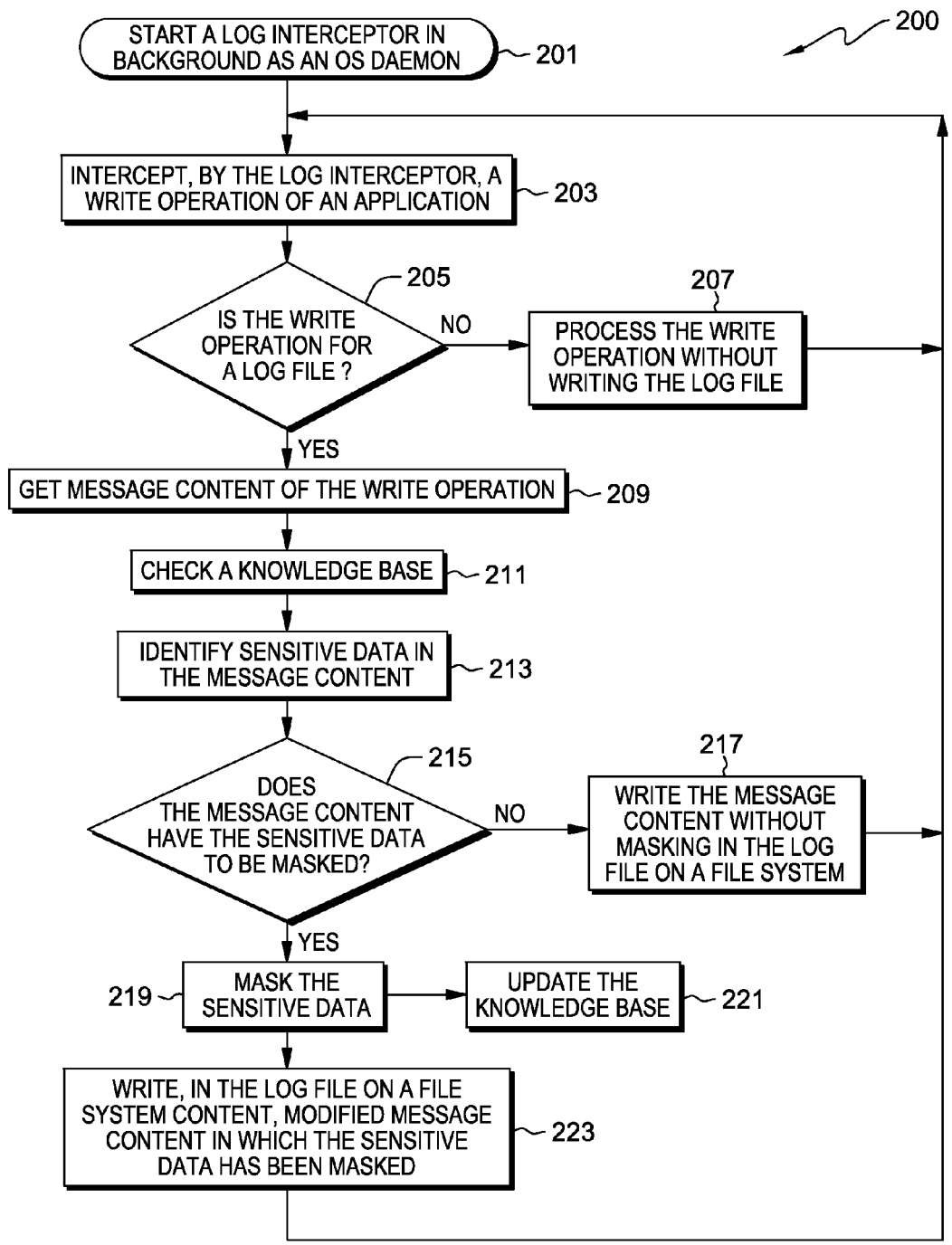
FIG. 2 is a flowchart illustrating operating steps for hiding sensitive data in log files, in accordance with one embodiment of the present invention.

FIG. 2 is flowchart 200 illustrating operating steps for hiding sensitive data in log files, in accordance with one embodiment of the present invention. The operational steps are implemented by log interceptor 110 (shown in FIG. 1) running in background as a daemon of OS 120 (shown in FIG. 1).

At step 201, log interceptor 110 starts in background as a daemon of OS 120. At step 203, log interceptor 110 intercepts a write operation of an application (one of application 1 130-1 through application N 130-N). Log interceptor 110 is capable of detecting write operations of application 1 130-1 through application N 130-N. At this step, log interceptor 110 intercepts one or more write APIs (Application Programming Interfaces) of OS 120.

At decision block 205, log interceptor 110 determines whether the write operation is for a log file. In determining that the write operation is not for the log file (NO branch of decision block 205), at step 207, log interceptor 110 allows the one or more write APIs of OS 120 to processes the write operation without writing the log file. After step 207, log interceptor 110, as a daemon of OS 120, continues to run in the background; it reiterates step 203 for the next write operation. In determining that the write operation is for the log file (YES branch of decision block 205), at step 209, log interceptor 110 gets message content of the write operation.

At step 211, log interceptor 110 checks knowledge base 140. Knowledge base 140 is customizable and stores some information that log interceptor 110 uses for identifying the sensitive data. The information on knowledge base 140 includes, for example, names of all log files that applications 1 through N (130-1 through 130-N) may write, customer sensitive information (e.g., IP addresses, hostnames, user names, etc.), and additional custom recognizable patterns validated by users.

At step 213, log interceptor 110 identifies the sensitive data in the message content. Log interceptor 110 may include an embedded analytics engine to provide a confidence index that determines whether patterns or information in the message content are sensitive or not. Log interceptor 110 is a component that increases accuracy of the determination of the embedded analytics engine.

At decision block 215, log interceptor 110 determines whether the message content of the write operation has the sensitive data to be masked. In determining that the message content of the write operation does not have the sensitive data to be masked (NO branch of decision block 215), log interceptor 110 at step 217 allows the one or more write APIs of OS 120 to write, on file system 150, the message content without masking any data. After step 217, log interceptor 110, as a daemon of OS 120, continues to run in the background; it reiterates step 203 for the next write operation. In determining that the message content of the write operation has the sensitive data to be masked (YES branch of decision block 215), log interceptor 110 at step 219 masks the sensitive data. Log interceptor 110 manipulates the sensitive data by masking with some blanks or special strings.

After step 219, log interceptor 110 at step 221 updates knowledge base 140. Log interceptor 110 stores, on knowledge base 140, information of masking the sensitive data in the current write operation; thus, log interceptor 110 acts as a self-learning system. Updating knowledge base 140 can be done real time, or the message about updating can be marked as to be reviewed by a user. The user is able to determine whether the information of masking the sensitive data in the current write operation is used to update knowledge base 140.

At step 223, log interceptor 110 writes modified message content in the log file on file system 150. In the modified message, the sensitive data has been masked at step 219.

After step 223, log interceptor 110, as a daemon of OS 120, continues to run in the background; it reiterates step 203 for the next write operation.

Figure 3:
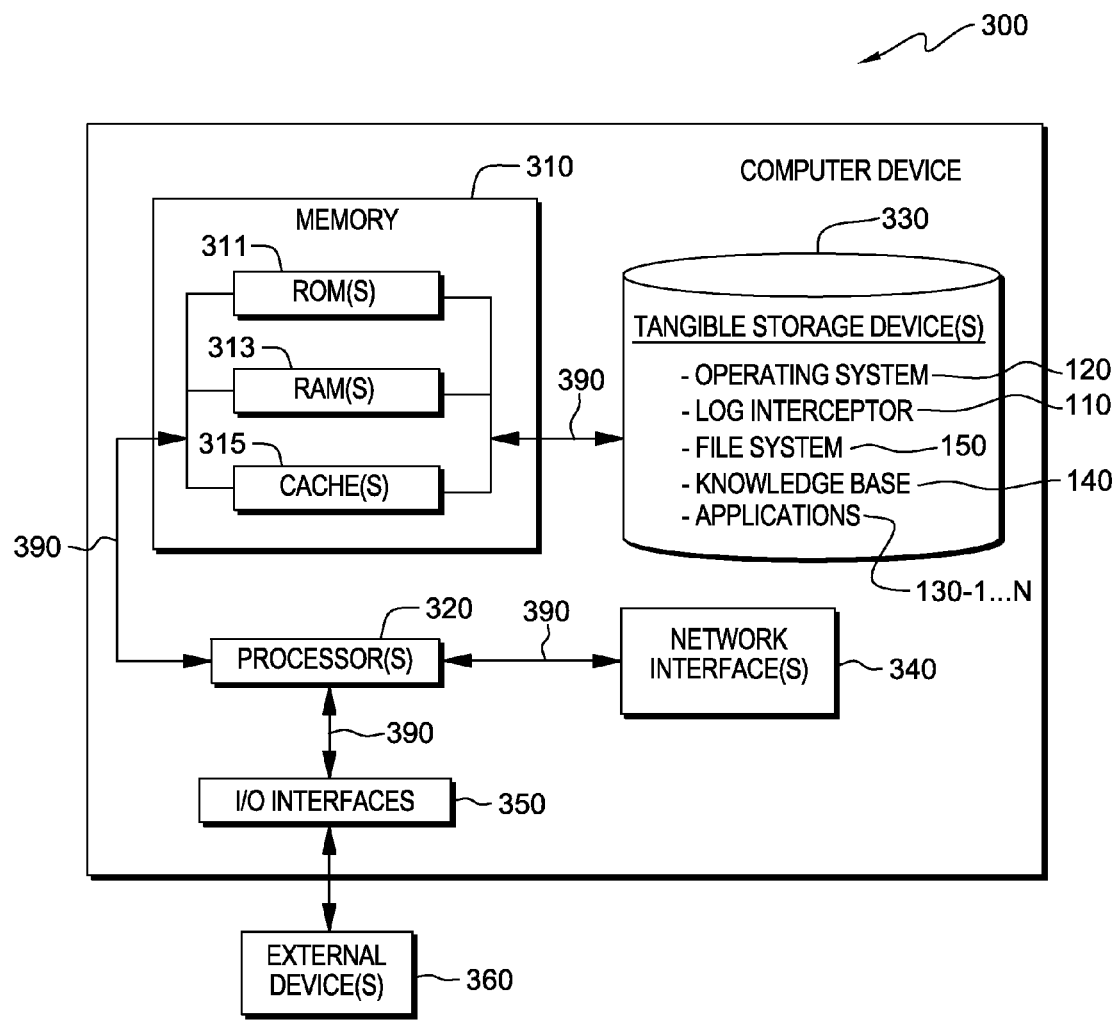
FIG. 3 is a diagram illustrating components of a computer device hosting the computer system shown in FIG. 1, in accordance with one embodiment of the present invention.

FIG. 3 is a diagram illustrating components of computer device 300 hosting computer system 100 shown in FIG. 1, in accordance with one embodiment of the present invention. It should be appreciated that FIG. 3 provides only an illustration of one implementation and does not imply any limitations with regard to the environment in which different embodiments may be implemented. In other embodiments, computer system 100 may be hosted by a cluster of computing devices connected by a network.

Referring to FIG. 3, the hardware of computer device 300 includes processor(s) 320, memory 310, tangible storage device(s) 330, network interface(s) 340, and I/O (input/output) interface(s) 350. In FIG. 3, communications among the above-mentioned components of computing device 300 are denoted by numeral 390. Memory 310 includes ROM(s) (Read Only Memory) 311, RAM(s) (Random Access Memory) 313, and cache(s) 315.

Operating system 120 and log interceptor 110 reside on one or more computer-readable tangible storage device(s) 330. In accordance with one embodiment of the present invention, applications 1 through N (130-1 through 130-N) reside on at least one of one or more computer-readable tangible storage device(s) 330. In other embodiments, one or more of applications 1 through N (130-1 through 130-N) may reside on at least one other computer device which is connected through a network to a computer device hosting operating system 120 and log interceptor 110. In accordance with one embodiment of the present invention, knowledge base 140 resides on at least one of one or more computer-readable tangible storage device(s) 330. In other embodiments, knowledge base 140 may reside on at least one other computer device which is connected through a network to a computer device hosting operating system 120 and log interceptor 110. In accordance with one embodiment of the present invention, file system 150 resides on at least one of one or more computer-readable tangible storage device(s) 330. In other embodiments, file system 150 may reside on at least one other computer device which is connected through a network to a computer device hosting operating system 120 and log interceptor 110.

Computing device 300 further includes I/O interface(s) 350. I/O interface(s) 350 allows for input and output of data with external device(s) 360 that may be connected to computing device 300. Computing device 300 further includes network interface(s) 340 for communications between computing device 300 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for hiding sensitive data in log files, the method comprising:
intercepting, by a log interceptor for hiding the sensitive data in the log files, a write operation of an application, wherein the log interceptor is embedded within an operating system and runs as a daemon in background, wherein the log interceptor comprises an analytics engine and the analytics engine provides a confidence index that determines whether patterns and information in message content of the write operation are sensitive;
getting, by the log interceptor, content of the write operation, in response to determining that the write operation is for a log file;
checking, by the log interceptor, a knowledge base, the knowledge base comprising information for the sensitive data, the information for the sensitive data including names of log files that applications write and customer sensitive information;
identifying, by the log interceptor, the sensitive data in the content of the write operation, by using the confidence index;
masking, by the log interceptor, the sensitive data in the content of the write operation, in response to determining that the content of the write operation has the sensitive data to be masked;
writing, by the log interceptor, in the log file, modified content in which the sensitive data is masked; and updating, by the log interceptor, the knowledge base, by storing information of masking the sensitive data in the write operation.

2. The computer-implemented method of claim 1, further comprising:
processing, by the log interceptor, the write operation without writing the log file, in response to determining that the write operation is not for the log file.

3. The computer-implemented method of claim 1, further comprising:
writing the content, by the log interceptor, without masking in the log file, in response to determining that the content of the write operation does not have the sensitive data to be masked.

4. The computer-implemented method of claim 1, wherein the log interceptor intercepts a write API (Application Programming Interface) of the operating system.

5. A computer program product for hiding sensitive data in log files, the computer program product comprising a computer readable storage medium having program code, the program code executable to:
intercept, by a log interceptor for hiding the sensitive data in the log files, a write operation of an application, wherein the log interceptor is embedded within an operating system and runs as a daemon in background, wherein the log interceptor comprises an analytics engine and the analytics engine provides a confidence index that determines whether patterns and information in message content of the write operation are sensitive;
get, by the log interceptor, content of the write operation, in response to determining that the write operation is for a log file;
check, by the log interceptor, a knowledge base, the knowledge base comprising information for the sensitive data, the information for the sensitive data including names of log files that applications write and customer sensitive information;
identify, by the log interceptor, the sensitive data in the content of the write operation, by using the confidence index;
mask, by the log interceptor, the sensitive data in the content of the write operation, in response to determining that the content of the write operation has the sensitive data to be masked;
write, by the log interceptor, in the log file, modified content in which the sensitive data is masked; and
update, by the log interceptor, the knowledge base, by storing information of masking the sensitive data in the write operation.

6. The computer program product of claim 5, further comprising the program code executable to:
process, by the log interceptor, the write operation without writing the log file, in response to determining that the write operation is not for the log file.

7. The computer program product of claim 5, further comprising the program code executable to:
write the content, by the log interceptor, without masking in the log file, in response to determining that the content of the write operation does not have the sensitive data to be masked.

8. The computer program product of claim 5, wherein the log interceptor intercepts a write API (Application Programming Interface) of the operating system.

9. A computer system for hiding sensitive data in log files, the computer system comprising:
one or more processors, one or more computer-readable tangible storage devices, and program instructions, the program instructions stored on at least one of the one or more computer-readable tangible storage devices for execution by at least one of the one or more processors, the program instructions executable to:
intercept, by a log interceptor for hiding the sensitive data in the log files, a write operation of an application, wherein the log interceptor is embedded within an operating system and runs as a daemon in background, wherein the log interceptor comprises an analytics engine and the analytics engine provides a confidence index that determines whether patterns and information in message content of the write operation are sensitive;
get, by the log interceptor, content of the write operation, in response to determining that the write operation is for a log file;
check, by the log interceptor, a knowledge base, the knowledge base comprising information for the sensitive data, the information for the sensitive data including names of log files that applications write and customer sensitive information;
identify, by the log interceptor, the sensitive data in the content of the write operation, by using the confidence index;
mask, by the log interceptor, the sensitive data in the content of the write operation, in response to determining that the content of the write operation has the sensitive data to be masked;
write, by the log interceptor, in the log file, modified content in which the sensitive data is masked; and
update, by the log interceptor, the knowledge base, by storing information of masking the sensitive data in the write operation.

10. The computer system of claim 9, further comprising the program instructions executable to:
process, by the log interceptor, the write operation without writing the log file, in response to determining that the write operation is not for the log file.

11. The computer system of claim 9, further comprising the program instructions executable to:
write the content, by the log interceptor, without masking in the log file, in response to determining that the content of the write operation does not have the sensitive data to be masked.

12. The computer system of claim 9, wherein the log interceptor intercepts a write API (Application Programming Interface) of the operating system.

* * * * *